Patented May 27, 1930

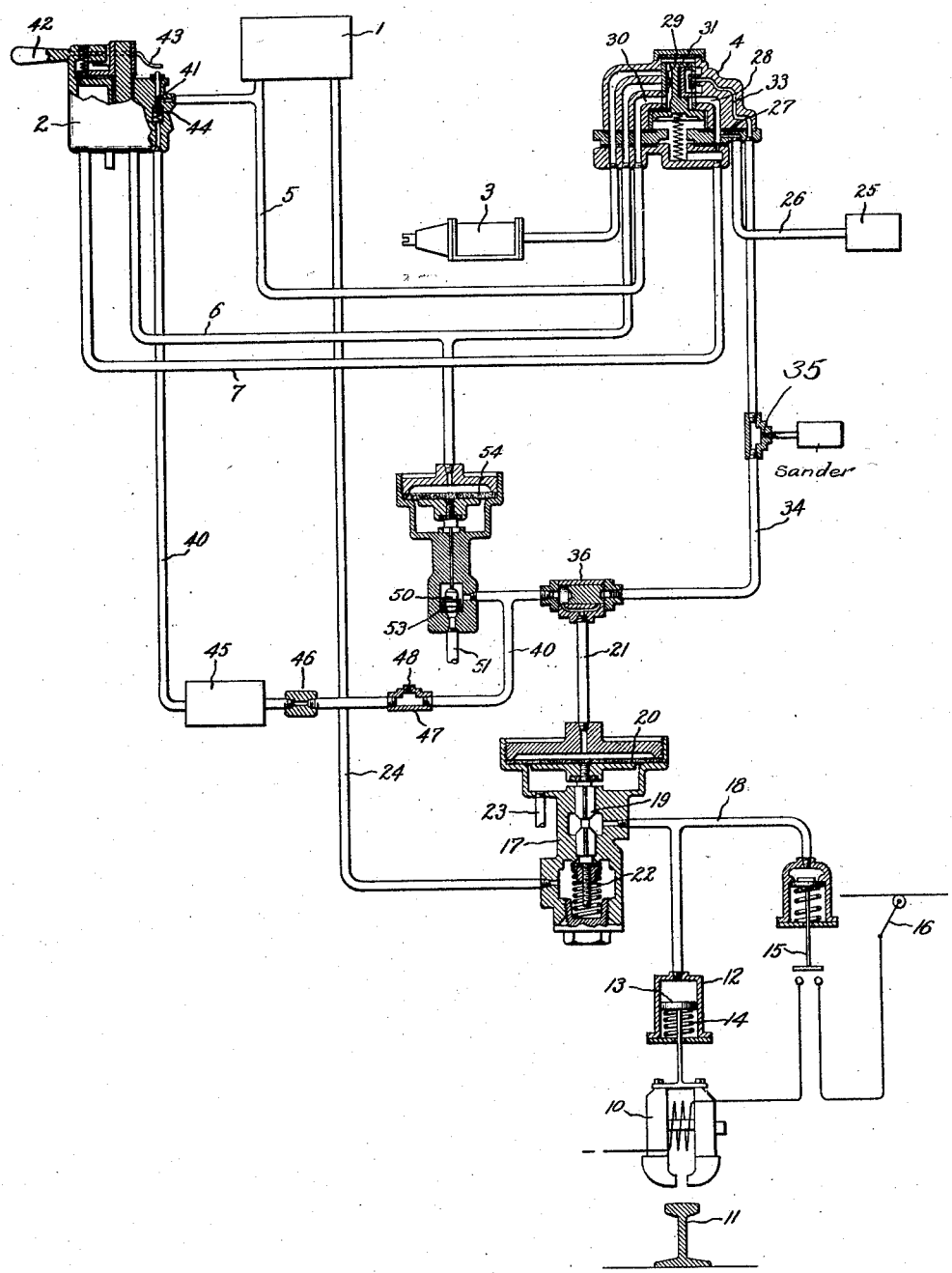

1,760,543

UNITED STATES PATENT OFFICE

HORACE A. DAVIS, OF ERIE, PENNSYLVANIA, ASSIGNOR TO GENERAL ELECTRIC COMPANY, A CORPORATION OF NEW YORK

BRAKE SYSTEM

Application filed September 28, 1926. Serial No. 138,152.

My invention relates to brake systems and particularly to combined wheel and track brake systems and its object is to provide an improved control arrangement for the track brakes whereby they may be operated to assist the wheel brakes under certain conditions thereof.

In accordance with my invention, I provide an improved arrangement for controlling the track brakes whereby they may be applied at the will of the operator whenever a predetermined service application of the fluid pressure wheel brakes is made.

My invention will be better understood from the following description taken in connection with the accompanying drawing, which is a diagram, partially in section, of a combined straight air wheel brake system with emergency feature and a magnetic track brake system embodying my invention, and its scope will be pointed out in the appended claims.

While my invention is applicable to various types of air brake systems, and particularly to straight air brake systems, I have preferred to show my invention in the accompanying drawing in connection with a well known type of straight air brake system with emergency feature. This type of system comprises a main reservoir 1, a brake valve 2, a brake cylinder 3, an emergency valve 4, a main reservoir pipe 5, a straight air pipe 6 and an emergency pipe 7. As is well known in the art, the emergency valve 4 is normally maintained in the position shown in the drawing, in which position the straight air pipe 6 is in communication with the brake cylinder 3. Therefore, a straight air application of the brakes may be effected by moving the brake valve 2 so that it establishes communication between the main reservoir pipe 5 and the straight air pipe 6 and the brakes may be released by moving the brake valve 2 so that it establishes communication between the straight air pipe 6 and atmosphere. The emergency valve 4, which may be of any suitable type, examples of which are well known in the art, is also arranged when the pressure in the emergency pipe 7 decreases at a rapid rate, to close communication between the brake cylinder 3 and the straight air pipe 6 and to open communication between the brake cylinder 3 and the main reservoir pipe 5 so as to effect an emergency application of the brakes.

The magnetic track brake system comprises a magnetic track brake 10 which may be of any suitable construction, examples of which are well known in the art. Preferably the brake is normally carried out of operative relation with the track 11 so that there is sufficient clearance to prevent small articles that may be on the track from being caught between the track and the brake. Any suitable means may be provided for moving the track brake into and out of operative relation with the track. As shown in the drawing, a fluid pressure cylinder 12 containing a piston 13 secured to the brake 10 and an opposing spring 14 is provided for this purpose. A fluid pressure operated switch 15 which may be of any suitable construction, examples of which are well known in the art, is also provided for controlling the energizing circuit of the magnetic brake. The brake may be supplied with current from any suitable source of current. As shown in the drawing, the switch 15 connects the brake winding directly to the trolley 16.

For effecting the operation of the magnetic track brake 10 when an emergency application of the air brakes is made, I have disclosed the arrangement disclosed and claimed in the copending application of Charles A. Ives and George Macloskie, Serial No. 138,159, filed concurrently herewith and assigned to the assignee of my application.

This arrangement comprises a fluid operated relay valve 17 of any suitable construction, examples of which are well known in the art. The valve 17 is arranged to be operated, for a certain length of time when an emergency application of the air brakes is made, to establish communication between a pipe 18, through which fluid pressure is supplied to the cylinder 12 and the pneumatic switch 15, and a suitable source of fluid pressure which is shown in the drawing as the main reservoir 1. As shown the relay valve 17 comprises a double beat valve 19 which is adapted to be operated by a diaphragm 20, one side of which is subject to the pressure in a pipe 21. When there is no fluid pressure in the pipe 21, the double beat valve 19 is held in the position shown in the drawing by a spring 22 so that it establishes communication between the pipe 18 and a pipe 23 leading to atmosphere. When, however, fluid pressure is supplied to the pipe 21, the diaphragm 20 is moved downwardly so that the double beat valve 19 is operated to close communication between pipe 18 and atmosphere and to establish communication between pipe 18 and pipe 24 which is connected to the main reservoir 1.

In order that fluid pressure may be supplied to the pipe 21 to effect the operation of the magnetic track brake 10 when an emergency application of the air brakes is made, the emergency valve 4 is arranged so that when it is in its normal position it connects an auxiliary reservoir 25 to the main reservoir pipe 5 by means of a pipe 26, passages 27 and 28, valve chamber 29 and passage 30 so that the auxiliary reservoir 25 is normally charged with fluid pressure. When the emergency valve 4 is in its emergency position, its slide valve 31 closes communication between passage 28 and the valve chamber 29 and establishes communication between passage 28 and a passage 33 which is connected to the pipe 21 through a pipe 34 and a double check valve 36.

In order that the track brake will remain operated for only a predetermined time, the pipe 34 is provided with a T 35 which has a relatively small opening to atmosphere so that after a predetermined time the fluid pressure in the auxiliary reservoir 25 becomes exhausted and the relay valve 17 is restored to its normal position by the spring 22. If desirable the fluid pressure that escapes through the opening 35 may be used for any suitable purpose, such as operating a sander to sand the track.

In accordance with my invention, I provide an improved arrangement whereby the relay valve 17 may be operated and released at the will of the operator while a service application of the air brakes is effected. In accordance with my improved arrangement, I provide a pipe 40 which is arranged to be connected to any suitable source of fluid pressure such, as the main reservoir 1, by means of any suitable manually controlled valve 41 which is so located that it can be operated readily by the operator while controlling the air brakes. As shown in the drawing the valve 41 is mounted on the brake valve 2 and is arranged to be opened by the operator rocking the brake valve handle 42 so that an arm 43 attached thereto engages the stem of the valve 41. The valve 41 is normally held closed by a spring 44. When the valve 41 is open, communication is established between the main reservoir 1 and the pipe 40. The pipe 40 is also connected to the double check valve 36 through a volume reservoir 45, a choke 46 and a T 47 provided with a small opening 48 to atmosphere. The volume reservoir 45, choke 46 and opening 48 are provided as a means for maintaining the pressure in the pipe 40 for a predetermined time after valve 41 is closed.

The double check valve 36 is arranged so that whenever the fluid pressure in pipe 40 or pipe 34 exceeds the fluid pressure in the other by a predetermined amount, the valve 36 is moved into a position, if it is not already in that position, so as to establish communication between pipe 21 and the pipe having the greater pressure and to cut off communication between pipe 21 and the pipe having the lower pressure.

In order to prevent fluid pressure from building up to a sufficiently high value in the portion of the pipe 40 leading to the relay valve 17 in case the valve 41 is opened before a straight air application of the air brakes is made, a cut off valve 50 is provided which normally connects the pipe 40 to atmosphere through a relatively large exhaust pipe 51. The valve 50 is arranged so that when the pressure in the straight air pipe 6 exceeds a predetermined value, it closes the communication between pipes 40 and 51 so that the pressure in pipe 40 can build up to a sufficiently high value to operate the relay valve 17. As shown the valve 50 is normally held off its seat by a spring 53 and is adapted to be moved onto its seat by a diaphragm 54, the upper side of which is subject to the pressure in the straight air pipe 6.

The operation of the arrangement shown is as follows: So long as the air brakes are off, the devices are in the positions shown. Whenever an emergency application of the air brakes is made so that the emergency valve 4 is moved into its emergency position, the slide valve 31 operates to disconnect the auxiliary reservoir 25 from the main reservoir pipe 5 and to establish communication between the auxiliary reservoir 25 and the pipe 21 through pipe 34 and double check valve 36. As soon as the fluid pressure in the pipe 21 builds up to a predetermined value, the diaphragm 20 of the relay valve 17 moves downwardly so that the double beat valve 19 is operated to close communication between the pipes 18 and 23 and to open communication between pipes 18 and 24. Therefore, fluid pressure is supplied from the main reservoir 1 through pipes 24 and 18 to the cylinder 12 and the pneumatic switch 15 so that the magnetic track brake 10 is moved into operative relation with the track 11 and is supplied with current from the trolley 16.

After a predetermined time, which is determined by the size of the opening 35, the amount of fluid pressure in the auxiliary reservoir 25 and pipe 21 becomes insufficient to maintain the relay valve 17 in its operated position. The spring 22 then restores the relay valve 17 to its normal position in which position communication is reestablished between pipe 18 and exhaust pipe 23, so that the magnetic track brake 10 is deenergized and is moved out of operative relation with the track.

As soon as the emergency valve 4 is restored to its normal position, the auxiliary reservoir 25 is reconnected to the main reservoir pipe 5 and is recharged with fluid pressure.

When a straight air application of the air brakes is made by supplying fluid pressure to the straight air pipe 6, fluid pressure is impressed upon the top of the diaphragm 54 so that the valve 50 is closed to cut off communication between pipe 40 and exhaust pipe 51. The operator can then effect the operation of the track brake by moving the handle 42 of his brake valve 2 so that valve 41 is opened to establish communication between main reservoir 1 and pipe 40. Due to the choke 46, the volume reservoir 45 becomes fully charged very quickly. When the pressure in the pipe 40 exceeds the pressure in pipe 34 by a predetermined amount, the check valve 36 is moved to the right, if it is not already in that position so that communication is established between pipes 40 and 21 and is cut off between pipes 34 and 21. The relay valve 17 is then operated in the manner heretofore described to effect the operation of the track brake 10.

When the operator desires to release the track brake, without first releasing the air brakes, he moves his brake handle 42 so as to close valve 41. Then as soon as sufficient air has escaped through the opening 48 to reduce the pressure in pipe 40 to a predetermined value, relay valve 17 is restored to its normal position by the spring 22 and the track brake 10 is released in the manner heretofore described.

It will be observed that if the track brake is applied at the time the air brakes are released after a service application, the track brake is also released immediately since the valve 50 is open to establish communication between pipes 40 and 51. Also it will be evident that if the operator attempts to apply the track brake 10 by opening the valve 41 before a service application of the air brakes has been made, the valve 50 will be in such a position as to exhaust to atmosphere the fluid pressure in pipe 40 so that the relay valve will not be operated.

While I have in accordance with the patent statutes shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States is:—

1. In combination, a straight air brake system comprising a straight air pipe, a track brake, fluid pressure operated means for controlling the operation of said track brake, a control pipe for supplying fluid pressure to said fluid pressure operated means, said pipe normally being in communication with the atmosphere through a relatively large opening, a volume reservoir in said control pipe, manually operated means for controlling the supply of fluid pressure to said control pipe, means responsive to the fluid pressure in said straight air pipe for closing the communication between said control pipe and atmosphere through the relatively large opening; and means for exhausting fluid pressure from said control pipe and volume reservoir through a relatively small opening when said relatively large opening is closed and said manually operated means is removed to a position to cut off the supply of fluid pressure to said pipe.

2. In combination, a straight air brake system comprising a straight air pipe and a source of fluid pressure, fluid pressure operated means for controlling the operation of said track brake, a control pipe for supplying fluid pressure to said fluid pressure operated means, said pipe being in communication with the atmosphere through a relatively small opening and a relatively large opening, a volume reservoir and a choke in said control pipe, valve means adapted to be operated by the operator to control communication between said source of fluid pressure and said control pipe, and means responsive to a predetermined amount of fluid pressure in said straight air pipe for closing the communication between said control pipe and atmosphere through said relatively large opening.

3. In combination, an air brake system comprising a brake valve and a handle therefor, a track brake, fluid pressure operated means for controlling the operation of said track brake, a pipe for supplying fluid pressure to said fluid pressure operated means, means responsive to an application of the air brakes for controlling the fluid pressure in said pipe, and means adapted to be operated by said brake valve handle for controlling the fluid pressure in said pipe.

4. In combination, a straight air brake system comprising a straight air pipe, a brake valve, and a handle for operating said brake valve, a track brake, fluid pressure operated means for controlling the operation of said track brake, a control pipe for supplying fluid pressure to said fluid pressure operated means, means responsive to pressure in said straight air pipe for controlling the fluid pressure in said control pipe, and valve means adapted to be operated by said brake valve handle for controlling the fluid pressure in said control pipe.

5. In combination, an air brake system comprising a brake valve and a handle therefor, a track brake, fluid pressure operated means for controlling the operation of said track brake, a pipe for supplying fluid pressure to said fluid pressure operated means, means responsive to a predetermined application of the air brakes for controlling the supply of fluid pressure to said fluid pressure operated means through said pipe, and means adapted to be operated by said brake valve handle for controlling the fluid pressure in said pipe.

6. In combination, a track brake, fluid pressure operated means for controlling the operation of said track brake, a pipe for supplying fluid pressure to said fluid pressure operated means, a volume reservoir in said pipe, means for exhausting fluid pressure from said pipe to atmosphere through a relatively small opening, a source of fluid pressure, and a manually controlled valve for establishing communication between said reservoir and said source of fluid pressure.

7. In combination, an air brake system, a track brake, fluid pressure operated means for controlling the operation of said track brake, a control pipe for supplying fluid pressure to said fluid pressure operated means, a volume reservoir connected to said pipe, means for exhausting fluid pressure from said pipe to atmosphere through a relatively small opening, means responsive to a predetermined application of the air brakes for controlling the supply of fluid pressure to said fluid pressure operated means through said pipe, a source of fluid pressure and a manually controlled valve for establishing communication between said reservoir and said source of fluid pressure.

8. In combination, an air brake system, a track brake, fluid pressure operated means for controlling the operation of said track brake, a pipe for supplying fluid pressure to said fluid pressure operated means, said pipe normally being in communication with the atmosphere through a relatively large opening, means responsive to an application of the air brakes for cutting off the communication between said pipe and atmosphere through the relatively large opening, and means for exhausting fluid pressure from said pipe to atmosphere through a relatively small opening.

In witness whereof, I have hereunto set my hand this 25th day of Sept., 1926.

HORACE A. DAVIS.